United States Patent
Besutti et al.

(10) Patent No.: US 12,508,668 B2
(45) Date of Patent: Dec. 30, 2025

(54) STONE, IN PARTICULAR FOR A HOROLOGICAL MOVEMENT, AND THE MANUFACTURING METHOD THEREOF

(71) Applicant: Comadur SA, Le Locle (CH)

(72) Inventors: Bruno Besutti, Charquemont (FR); Sébastien Retrouvey, Chissey sur Loue (FR); Benoit Giry, Neuchatel (CH); Pierry Vuille, Les Emibois (CH)

(73) Assignee: Comadur SA, Le Locle (CH)

( * ) Notice: Subject to any disclaimer, the term of this patent is extended or adjusted under 35 U.S.C. 154(b) by 764 days.

(21) Appl. No.: 17/629,942

(22) PCT Filed: Jun. 16, 2020

(86) PCT No.: PCT/EP2020/066637
§ 371 (c)(1),
(2) Date: Jan. 25, 2022

(87) PCT Pub. No.: WO2021/018464
PCT Pub. Date: Feb. 4, 2021

(65) Prior Publication Data
US 2023/0161296 A1 May 25, 2023

(30) Foreign Application Priority Data
Jul. 26, 2019 (EP) .................... 19188644

(51) Int. Cl.
B23K 26/0622 (2014.01)
B23K 26/382 (2014.01)
(Continued)

(52) U.S. Cl.
CPC ........ B23K 26/0624 (2015.10); B23K 26/382 (2015.10); G04B 31/008 (2013.01); G04B 31/06 (2013.01)

(58) Field of Classification Search
None
See application file for complete search history.

(56) References Cited

U.S. PATENT DOCUMENTS 12,055,893 B2 * 8/2024 Cunto ................. G04D 3/0084
2002/0135108 A1 * 9/2002 Billiet ................. C04B 35/632
264/669
(Continued)

FOREIGN PATENT DOCUMENTS

CH 705 944 A2 6/2013
EP 3 367 182 A1 8/2018
(Continued)

OTHER PUBLICATIONS

Notice of the Reason for Refusal issued Jan. 24, 2023 in Japanese Patent Application No. 2022-503517 (with English language translation), 6 pages.
(Continued)

Primary Examiner — Jacob J Cigna
(74) Attorney, Agent, or Firm — Oblon, McClelland, Maier & Neustadt, L.L.P.

(57) ABSTRACT

A method is for manufacturing a stone, in particular for a timepiece, from a mineral body of monocrystalline or polycrystalline type. The method includes an ablation step in which the body is subjected to a material ablation by scanning on at least one face of the body using ultra-short pulse laser radiation whose duration is less than one hundred picoseconds, and whose beam is guided by a precession system having at least three axes to at least partially cancel the angle of the laser cone, which is due to the focusing of the laser. A mineral stone of monocrystalline or polycrystalline type, in particular for a horological movement, is likely to be obtained by the method. The stone includes in
(Continued)

particular a face provided with a peripheral rim, in particular for laterally clamping an endstone in a bearing.

20 Claims, 2 Drawing Sheets

(51) Int. Cl.
 *G04B 31/008* (2006.01)
 *G04B 31/06* (2006.01)

(56) References Cited

U.S. PATENT DOCUMENTS

| | | | |
|---|---|---|---|
| 2013/0175243 | A1 | 7/2013 | Wang |
| 2017/0066078 | A1 | 3/2017 | Morikazu et al. |
| 2017/0072511 | A1 | 3/2017 | DiGiovanni et al. |
| 2019/0146416 | A1* | 5/2019 | Besutti ............ G04B 31/004 368/318 |
| 2020/0326656 | A1* | 10/2020 | Cunto ............ G04B 1/16 |

FOREIGN PATENT DOCUMENTS

| | | |
|---|---|---|
| JP | 2008-501534 | 1/2008 |
| JP | 2018-530437 | 10/2018 |
| JP | 2019-12061 A | 1/2019 |
| WO | WO 2009/060074 A1 | 5/2009 |
| WO | WO-2017029210 A1 * | 2/2017 ............ B23K 26/00 |
| WO | WO 2018/114149 A1 | 6/2018 |

OTHER PUBLICATIONS

Combined Chinese Office Action and Search Report issued Oct. 10, 2023, in corresponding Chinese Patent Application No. 202080053930.7 (with English Translation of Category of Cited Documents), 115 pages.
International Preliminary Report on Patentability issued October 6, 2021in PCT/EP2020/066637 (English Translation only), 6 pages.
International Search Report mailed on Aug. 19, 2020 in PCT/EP2020/066637 filed on Jun. 16, 2020 (2 pages).
International Report on Patentability issued on Oct. 6, 2021 in PCT/EP2020/066637 (with translation of category of cited documents), 12 pages.
Kemnitzer et al., "Next-Generation of High-Power, sub-300 fs Lasers with >100 W for Industrial Applications", 2017 Conference On Lasers and Electro-Optics Europe & European Quantum Electronics Conference (CLEO/Europe-EQEC), IEEE, XP033239695, Jun. 25, 2017, p. 1.
Notice of Final Rejection dated Mar. 27, 2025, issued in corresponding Korean Patent Application No. 10-2022-7001901 (with English translation).
Notice of Ruling to Reject Amendment dated Mar. 27, 2025, issued in corresponding Korean Patent Application No. 10-2022-7001901 (with English translation).

* cited by examiner

STONE, IN PARTICULAR FOR A HOROLOGICAL MOVEMENT, AND THE MANUFACTURING METHOD THEREOF

CROSS-REFERENCE TO RELATED APPLICATIONS

The present application is a national stage entry of International Application No. PCT/EP2020/066637, filed Jun. 16, 2020, which claims priority to European Patent application Ser. No. 19/188,644.9, filed on Jul. 26, 2019, the entire content and disclosure of which are incorporated by reference herein.

FIELD OF THE INVENTION

The invention relates to a method for manufacturing a stone, in particular for a horological movement.

The invention also relates to a stone, in particular a bearing, provided with a rim.

The invention also relates to a horological movement including such a stone.

BACKGROUND OF THE INVENTION

In the state of the art of watchmaking, ruby or sapphire type stones are used in particular to form endstones or guide elements, called bushes, in timepieces. These endstones and guide elements are intended to come into contact with pivots in order to make the latter movable in rotation and this, with minimal friction. Thus, they form, for example, all or part of a bearing of an axis mounted in rotation. The guide elements generally comprise a through hole for inserting the pivot pin therein.

In principle, synthetic stones are used in horological movements. In particular, the Verneuil-type method is known for manufacturing stones of monocrystalline type. There are also stones of the polycrystalline type, which are manufactured by pressing a precursor in order to obtain a green body of the future stone from a pressing tool. The stones are then machined to obtain a finished shape with the desired dimensions.

In particular, regarding the guide elements made of polycrystalline stone, the pressing tool is for example provided with a wire participating in the construction of a hole rough. The stones of monocrystalline type are first laser drilled to obtain the hole rough. The final dimension of the hole is subsequently obtained thanks to machining.

However, the techniques of machining these stones, whether they are monocrystalline or polycrystalline, do not allow obtaining all desired shapes. Indeed, conventional machining is not accurate enough for some shapes. In particular, it is not possible to functionalise the stone surfaces beyond simple rough holes or recesses that should be finalised later.

SUMMARY OF THE INVENTION

The aim of the present invention is to overcome all or part of the previously mentioned drawbacks, by proposing a method for manufacturing a stone allowing the production of particular shapes and the functionalisation of surfaces accurately.

To this end, the invention relates to a method for manufacturing a stone, in particular for a timepiece, from a mineral body of monocrystalline or polycrystalline type, characterised in that it comprises an ablation step in which the body is subjected to a material ablation by scanning on at least one face of the body using ultra-short pulse laser radiation whose duration is less than one hundred picoseconds, and whose beam is guided by a precession system having at least three axes configured to at least partially cancel the angle of the laser cone, which is due to the focusing of said laser.

Thus, it is possible to remove material from the stone in an extremely accurate manner, and thus to obtain shapes and surfaces impossible to be formed with laser methods known from the state of the art. Such a device allows the laser beam focusing the laser beam with high accuracy, while at least partially cancelling the conical angle of the laser, which is due to the focusing of the laser. Indeed, the focusing generates a laser in the shape of a cone, which does not allow having an identical radius diameter over the entire height at the laser localisation point, such that the material ablation is not. The device allows cancelling the angle of the cone on at least one side of the beam, which in particular allows obtaining straight cuts. These straight cuts cannot be obtained with conventional cutting lasers.

In addition, the ultra-short pulses of the laser allow avoiding a thermal heating of the stone, which adversely affect the quality of the stone.

Furthermore, the surface state Ra of the stone obtained with the method according to the invention is in the range of 0.1 μm, which then allows polishing the stone with conventional polishing means, for example to obtain a Ra in the range of 0.025 μm. Thus, this method provides significant advantages while keeping an implementation without great complexity.

According to a particular embodiment of the invention, the ablation is performed layer by layer, each layer having a thickness within a range of 1 to 10 μm, preferably of 2 to 4 μm.

According to a particular embodiment of the invention, the pulses have a duration within a range of 200 to 400 fs, preferably a range of 250 to 350 fs, or even of 280 to 300 fs.

According to a particular embodiment of the invention, the laser has a wavelength within a range of 400 to 600 nm, preferably between 450 and 550 nm, or even of 500 nm.

According to a particular embodiment of the invention, the mineral body being of monocrystalline type, and comprising for example AL2O3, the method comprises a prior step of manufacturing the body by a Verneuil-type method.

According to a particular embodiment of the invention, the mineral body being of polycrystalline type, and comprising for example al2O3Cr type polyruby or ZrO2 type Zirconia, the method includes the following preliminary steps:
  producing a precursor from a mixture of at least one powder material with a binder;
  pressing of the precursor in order to form a green body, the pressing being carried out using an upper die and a lower die, and
  sintering of said green body in order to form the mineral body, of the future stone, from said at least one material.

According to a particular embodiment of the invention, the method comprises an additional finishing step, for example a lapping and/or a brushing and/or a polishing of the mineral body after the laser step, in particular on the ablation areas.

According to a particular embodiment of the invention, the laser ablation step comprises recessing a hole passing through the body.

According to a particular embodiment of the invention, the laser ablation step comprises recessing an inlet cone of the through hole.

According to a particular embodiment of the invention, the laser ablation step comprises recessing a face to form a peripheral rim on the face.

According to a particular embodiment of the invention, the laser ablation step comprises recessing the face to form a convex area.

According to a particular embodiment of the invention, the laser ablation step comprises recessing a peripheral face of the body to form a flared peripheral face of the body.

According to a particular embodiment of the invention, the laser ablation step comprises recessing an oil retention recess around the through hole on a face of the body.

According to a particular embodiment of the invention, the laser ablation step comprises the ablation of at least one portion of a face of the stone to make it planar.

The invention also relates to a mineral stone of monocrystalline or polycrystalline type, in particular for a horological movement, the stone being likely to be obtained by the method according to the invention. The stone is remarkable in that it comprises a face provided with a peripheral rim, in particular for laterally clamping an endstone in a bearing.

According to a particular embodiment of the invention, the stone comprises AL2O3 if it is of monocrystalline type, and it comprises al2O3Cr type polyruby or ZrO2 type Zirconia if it is of polycrystalline type.

According to a particular embodiment of the invention, the face comprises a bearing face for the endstone, the bearing face being disposed at the foot of the inner rim, the bearing face describing a circle.

According to a particular embodiment of the invention, the stone comprising a centred through hole, the face comprises a convex area delimited between the bearing face and the hole, the area being convex concentrically from the bearing face to the hole.

The invention also relates to a timepiece comprising such a stone, in particular for a bearing.

BRIEF DESCRIPTION OF THE DRAWINGS

Other features and advantages will emerge clearly from the description which is given below, by way of indication and without limitation, with reference to the appended drawings, in which.

DETAILED DESCRIPTION OF THE PREFERRED EMBODIMENTS

As explained above, the invention relates to a method for manufacturing a stone likely to form a guide element of a timepiece. The stone is for example intended to come into contact with a pivot in order to make the latter movable in rotation with minimal friction. It is therefore understood that the present invention allows in particular producing a stone which can form all or part of a bearing of an axis mounted in rotation.

The stone is formed from a mineral body, which may be of the monocrystalline type in a first embodiment, or of the polycrystalline type in a second embodiment. For the monocrystalline, the body comprises, for example, AL2O3, while for the polycrystalline, the body comprises, for example, al2O3Cr type polyruby or ZrO2 type Zirconia. According to the embodiment, the method for obtaining the mineral body is different.

Figure 1:
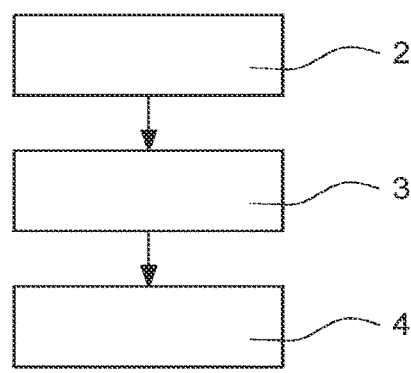
FIG. 1 is a block diagram of a first embodiment of a stone according to the method of the invention.

In the first embodiment of method 1, represented in FIG. 1, method 1 comprises a first step 2 of manufacturing the crystalline mineral body by a Verneuil-type method, which is well known in the field of watchmaking. The material is formed from a powder melted by an oxyhydrogen torch at over 2000° C. The body is crystallised after cooling below the melting point. The body is dimensioned so as to obtain dimensions close to those desired, in particular to facilitate its future machining.

According to the invention, the first embodiment comprises a second laser ablation step 3 to give a final shape to the stone. The laser ablation steps is described later in the description. Finally, a third finishing step 4 allows giving the stone a surface state compatible with its use. One seeks for example to obtain a surface state Ra=0.025 μm. Such a finishing step can thus include a lapping and/or a brushing and/or a polishing allowing the adjustment of the final dimensions and/or the removal of ridges and/or the local modification of the roughness.

Figure 2:
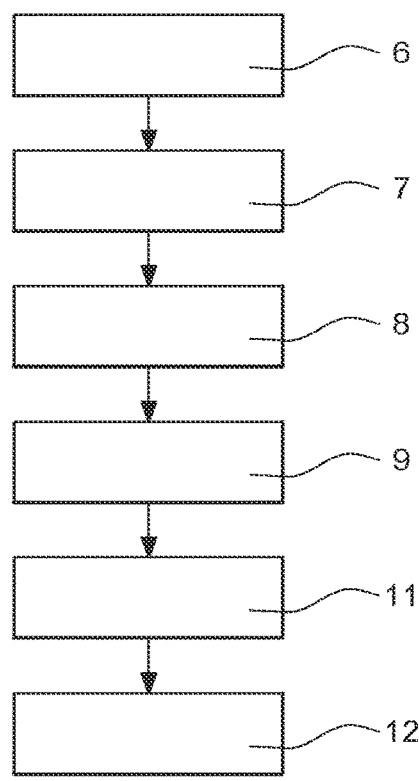
FIG. 2 is a block diagram of a second embodiment of a stone according to the method of the invention.

In the second embodiment 5 of the method, represented in FIG. 2, such a method includes a first step 6 of producing a precursor from a mixture of at least one powder material with a binder. This material can be, in a non-limiting and non-exhaustive manner, ceramic. This step is intended to form a precursor from a ceramic-based powder set in the binder.

In this context, the ceramic-based powder may include at least one metal oxide, one metal nitride or one metal carbide. For example, the ceramic-based powder may include aluminium oxide in order to form synthetic sapphire or a mixture of aluminium oxide and chromium oxide in order to form synthetic ruby, or else zirconium oxide. In addition, the binder can be of various natures such as, for example, of polymeric types or of organic types.

The second embodiment then includes a second step 7 of pressing the precursor from an upper die and a lower die of a pressing device, not represented in the Figures, in order to form the green body of the future stone.

Figure 3:
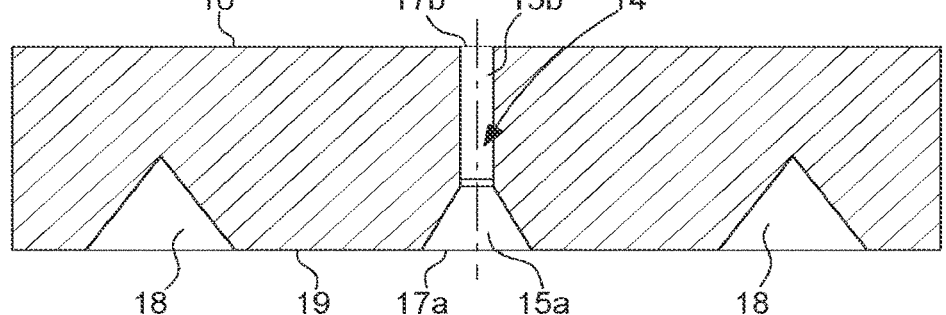
FIG. 3 is a schematic representation of a mineral body of polycrystalline type obtained after the sintering step of the second embodiment of the method of the invention.

The second embodiment includes a third step 8 of sintering the green body in order to form a body 10 visible in FIG. 3 in the material which may be, as we have mentioned previously, ceramic. In other words, this step 8 is intended to sinter the green body in order to form a ceramic body 10 of the future drilled stone. Preferably according to the invention, the sintering step 8 can include pyrolysis.

In FIG. 3, the body 10 comprises a through hole rough 14 provided with the upper and lower portions 15*a*, 15*b* which are of different shapes.

Indeed, the lower portion 15b which constitutes the rough of the functional element has a conical shape and the upper portion 15a which comprises the rough of the through hole 14 has a cylindrical shape. Such a through hole 14 also comprises a first opening 17a defined in the green body 10 and opening into the lower face 19 of this green body 10. The through hole 14 also comprises a second opening 17b defined in the green body 10 and opening into the upper face 16 of this green body 10.

The body 10 further comprises a groove 18 on the lower face 19 thereof. The groove 18 describes a centred spherical path around the through hole 14 and has a triangular-shaped section. This groove 18 is formed by the lower die of the pressing device, the lower die including a negative shape of the groove 18, such as an annular rib.

It will be noted that such a rough allows in particular forming the cone of engagement of the drilled stone for an easier mounting of the pivot, in particular when it is a question of mounting it blind in the drilled stone forming in this example a guide element. It is therefore understood that the shape of the through hole 14 is provided by the shape of a punch of the lower die of the pressing device. Thus, such a pressing step 7 is intended to compress, using the upper die and the lower die, the precursor in order to form said green body of the future drilled stone with the body 10 which comprises in particular the rough of the through hole 14.

Figure 4:
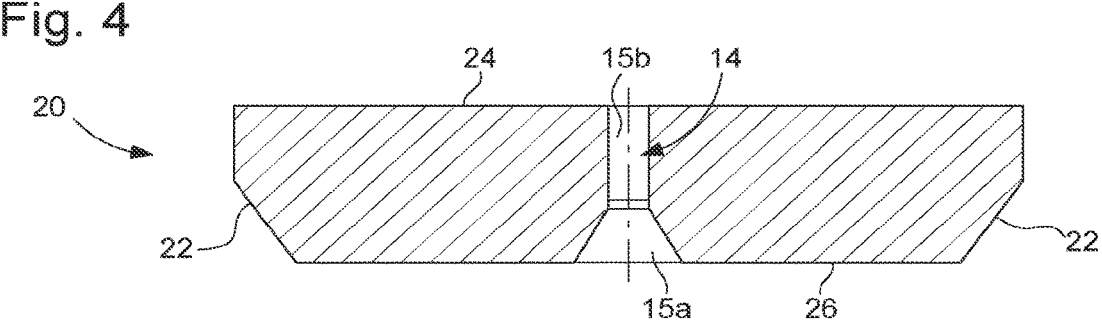
FIG. 4 is a schematic representation of a mineral body of polycrystalline type obtained after a machining step of the second embodiment of the method of the invention.

The second embodiment comprises a fourth step 9 of machining the body 10 of the future stone of FIG. 4. The fourth step includes a first sub-step of turning to shape the peripheral wall of the stone. Material is removed up to the top of the groove so as to obtain an at least partially flared peripheral wall 22. The machining step also comprises a sub-step of shaping the upper face 24 and the lower face 26 to obtain a predefined stone thickness.

Furthermore, this step also includes dimensioning the through hole allowing connecting the cone of the functional element 15a to said upper face 24.

The second embodiment comprises a fifth laser ablation step 11 to give a final shape to the stone.

Finally, a sixth finishing step 12 allows giving the stone a surface state compatible with its use. Such a finishing step can thus comprise a lapping and/or a brushing and/or a polishing allowing the adjustment of the final dimensions and/or the removal of ridges and/or the local modification of the roughness.

Both embodiments provide a monocrystalline or polycrystalline one-piece body depending on the embodiment.

According to the invention, during the laser ablation step 3, 11, the body is subjected to a material ablation by scanning on at least one face of the body using ultra-short pulse laser radiation whose duration is less than one hundred picoseconds, and whose beam is guided by a precession system having at least three axes configured to at least partially cancel the angle of the laser cone, which is due to the focusing of the laser. Such a device is for example described in the document WO 2017029210. There are different types of devices allowing at least partially cancelling the conical angle of the laser. Some devices use a five or six axis precession system.

Thus, the laser beam has at least one substantially straight edge, such that the surface of the stone can be recessed and given a specific shape. The ablation is performed layer by layer, the laser scanning an area of the body to recess it. Each layer has for example a thickness within a range of 1 to 10 µm, preferably of 2 to 4 µm. Material is removed layer by layer until obtaining the desired shape.

The laser, for example, has a wavelength comprised between 400 and 600 nm, preferably between 450 and 550 nm, or even in the range of 500 nm. The duration of the pulsation is less than the picosecond, for example within a range of 200 to 400 fs, preferably of 250 to 350 fs, or even of 280 to 300 fs. Such features allow recessing body without affecting the properties of the material forming the stone.

Figure 5:
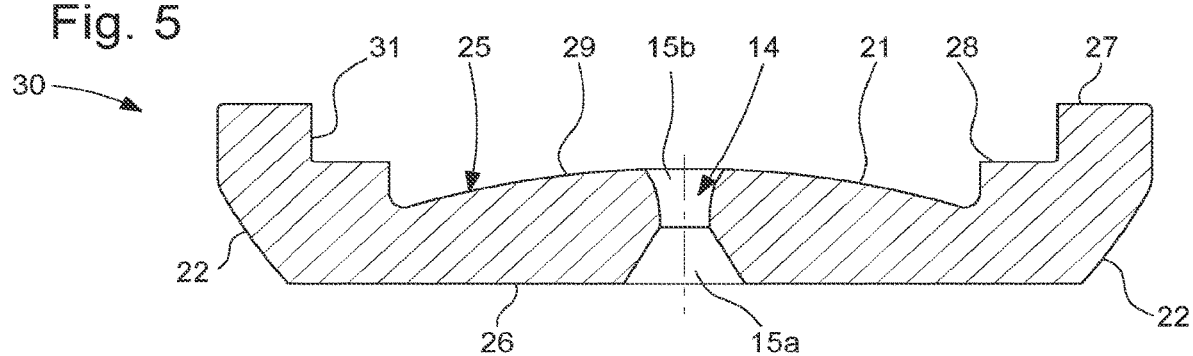
FIG. 5 is a schematic representation of a stone obtained by the process after the laser ablation step for the two embodiments of the invention.
Figure 6:
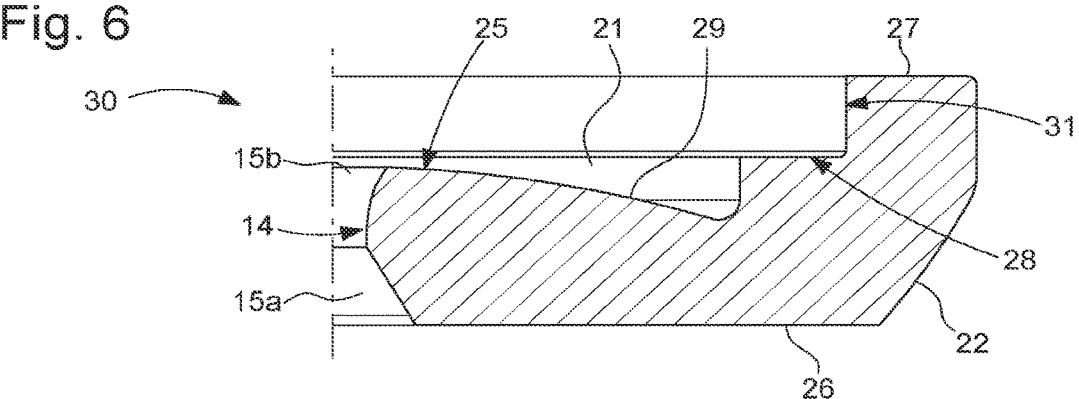
FIG. 6 is an enlarged view of portion of a stone of FIG. 5.

As shown by the stone obtained in FIGS. 5 and 6, the method allows in particular recessing the body 20 to obtain a peripheral rim 27 on the upper face 25 of the stone 30. The face 25 of the body 20 is recessed layer by layer on a central zone 29, leaving the edge of the upper face 25 intact. After several passages of the laser and a certain number of removed layers, the rim 27 is formed. Thanks to this method and to the laser device, a rim 27 is obtained, whose inner side 31 is straight with dimensions of high accuracy. The height of the rim 27 depends on the number of layers which have been removed and their thickness. A stone having for example a thickness of 0.18 mm and a diameter of 0.8 mm, has a rim comprised between 0.02 and 0.08 mm.

The method can also be used to form a partially convex 21 upper face 25 and/or to have several levels. In FIG. 5 or 6, the area 29 which has been recessed to form the rim 27, comprises a bearing face 28 for an endstone, and has a convex shape from the bearing face 28 to the hole 14 The bearing face 28 is higher than the convex area 21 so that the endstone rests only on this portion and not on the convex rest of the convex area 21. The convexity allows having the through hole as close as possible of the endstone, and similarly for the pivot.

Figure 7:
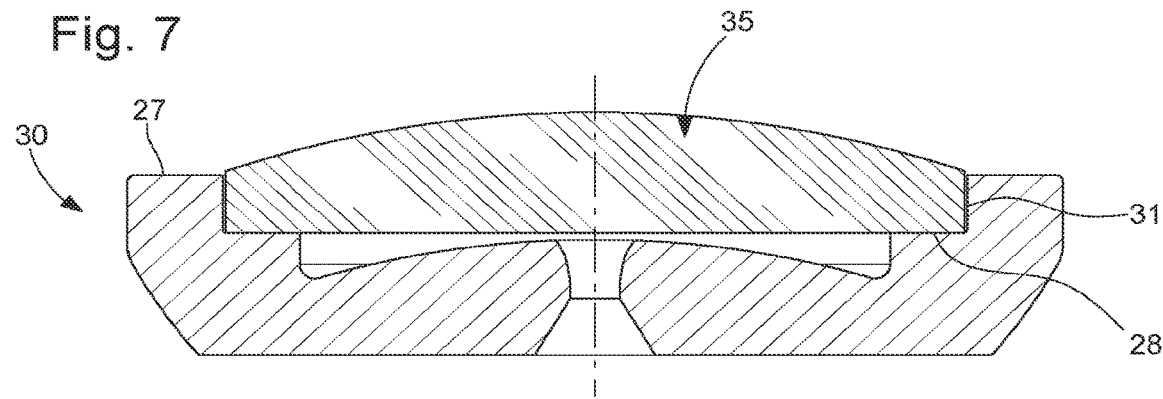
FIG. 7 is a schematic representation of a stone comprising a flange according to the invention, which is associated with an endstone.

An upper face with such a rim 27 allows, for example, laterally blocking an element arranged on the upper face of the stone, as shown in FIG. 7. In the case of a bearing for a balance axis, in which the stone 30 is used as a guide element, it is possible to dispose an endstone stone 35 such that it is laterally blocked by the inner side 31 of the rim 27 while resting on the bearing face 28. The endstone stone is dimensioned to correspond to the area 29 of the stone having undergone the laser ablation. The element forms an axial and radial support of the endstone in the housing. The endstone 35 is nested into the guide element 30 to support it axially and hold it laterally.

Thus, an assembly, comprising a guide element and an endstone, is obtained. Both can be used in a damper bearing, in particular. Such a guide element eliminates the need for a setting which holds the guide element in the bearing.

According to other embodiments, the laser ablation step allows the recessing of a peripheral face of the body to form a flared peripheral face of the body. The obtained stone has a bevelled peripheral face connecting a lower face of smaller surface area to an upper face of larger surface area. Such a peripheral face allows sliding the stone on an oblique face of the damper block in the case of an impact, in particular to transform a radial movement into axial movement. Thus, the peripheral face 22 of FIGS. 4 to 6 can be obtained for a monocrystalline or polycrystalline body. Thus, for the polycrystalline body, this is avoided during the machining step of the second embodiment.

Finally, the lower surface of the stone can be functionalised by recessing a cone at the entrance to the through hole. Thanks to this cone, if the pivot comes out of the hole due to an impact, the pivot returns to the hole without being damaged by the ridge of the edge of the hole. In the figures of the stones, the cone is roughed in a preliminary phase, in particular in the example of the polycrystalline body. However, the cone can be drilled by the method according to the invention without the need for a roughing cone, whether with a monocrystalline or polycrystalline mineral body.

It is still possible to recess the through hole in the stone. This method step allows directly drilling the hole to the right size, without having to go through a rough, then a machining step so that the hole has exact and homogeneous dimensions over the entire height of the hole.

Other shapes, not represented in the Figures, can be obtained by this method. For example, the laser ablation step comprises recessing an oil retention recess around the through hole on a face of the body. It is also possible to perform the ablation of at least one portion of a face of the stone to make it planar, and/or to give it a determined thickness. It is also possible to recess a functional element of a shape which is different from the cone, such as a hollow whose bottom is spherical.

As represented in FIGS. 5 to 7, the invention also relates to a stone 30, likely to be obtained by the previously described method 1, 5, the stone forming for example a guide element intended to be mounted in a bearing of a timepiece. However, such a stone could not be limited to the watchmaking field and can be applied to any element mounted movable relative to a bearing. The stone 30 comprises the features described in the method above. Advantageously, the stone 30 is crossed by a hole 14 intended to receive a pivot, also called a journal. The stone includes an upper surface 25 and a lower surface 26, one of which comprises a functional element 15a, herein a cone, communicating with the through hole 14. In other words, the hole 14 communicates with the upper surface 26 and also with a substantially conical recess defined in the lower surface 24. This recess then forms a cone of engagement of the drilled stone 2.

It is also noted that an inner wall of the body of this stone defined at the hole 14 includes a rounded area intended to minimise the contact with the pivot, but also to facilitate a possible lubrication. It will be noted that minimising the contact with the pivot allows in particular reducing the friction with the pivot.

According to the invention, the upper face 25 of the stone comprises a rim 27, in particular for laterally clamping an endstone in the case of a bearing. The rim 27 is preferably peripheral, that is to say that it delimits the edge of the upper face 25 of the stone 30. In addition, it defines an inner area 29 of the upper face 25 including a bearing face 28 and the exit of the through hole 14, and a concentrically convex area 21 from the bearing face 28 to the hole 14.

Furthermore, the stone has a flared peripheral face 22 connecting the lower face 26 of smaller surface area to the upper face 25 of larger surface area.

It will be noted that in a variant of stone, not represented in the Figures, the stone may comprise another functional element defined on the lower surface in place of the cone. The functional element has a hollow shape whose bottom is spherical. The hollow has the same function as the cone. The hollow can be obtained by laser ablation or by machining with a diamond chisel.

Of course, the present invention is not limited to the illustrated example, various variants and modifications are possible that will be evident to the person skilled in the art. In particular, other types of functional elements formed during the laser ablation step can be advantageously considered according to the invention.

The invention claimed is:

1. A method for manufacturing a synthetic stone, for a timepiece, from a mineral body of monocrystalline type comprising AL2O3, or of polycrystalline type comprising al2O3Cr type polyruby or ZrO2 type Zirconia, the method comprising:
   forming the body with a through hole extending from an upper face to a lower face, the through hole having a cylindrical shape;
   ablating in which the body is subjected to a material ablation by scanning on at least the upper face of the body using ultra-short pulse laser radiation whose duration is less than one hundred picoseconds, and whose beam is guided by a precession system having at least three axes configured to at least partially cancel a angle of a laser cone, which is due to focusing of said laser,
   wherein the ablating is performed layer by layer, each layer having a thickness within a range of 1 to 10 μm.

2. The method according to claim 1, wherein the pulses have a duration within a range of 200 to 400 fs.

3. The method according to claim 1, wherein the laser has a wavelength within a range of 400 to 600 nm.

4. The method according to claim 1, wherein, the mineral body being of the monocrystalline type, and the method comprises, prior to the ablating, manufacturing the body by a Verneuil method.

5. The method according to claim 1, wherein, the mineral body being of the polycrystalline type, the method comprising the following steps prior to the ablating:
   producing a precursor from a mixture of at least one powder material with a binder;
   pressing of the precursor to form a green body, the pressing being carried out using an upper die and a lower die, and
   sintering said green body to form the mineral body, of the stone, from said at least one material.

6. The method according to claim 1, wherein the method comprises an additional finishing step, said additional finishing step including at least one of lapping, brushing, and polishing of the mineral body after the ablating.

7. The method according to claim 1, wherein the ablating comprises recessing the upper face to form a convex area.

8. The method according to claim 1, wherein the ablating comprises recessing a peripheral face of the body to form a flared peripheral face of the body.

9. The method according to claim 1, wherein the ablating comprises recessing an oil retention recess around the through hole on the upper face of the body.

10. The method according to claim 1, wherein the ablating comprises the ablation of at least one portion of the lower face of the stone to make the lower face of the stone planar.

11. The method according to claim 1, wherein the synthetic stone is a synthetic sapphire or synthetic ruby.

12. The method according to claim 1, wherein the thickness of each layer is within the range of 2 to 4 μm.

13. The method according to claim 1, wherein the ablating comprises recessing a hole passing through the body.

14. The method according to claim 13, wherein the ablating comprises recessing an inlet cone of the through hole.

15. The method according to claim 1, wherein the ablating comprises recessing the upper face to form a peripheral rim on an outer periphery of the upper face.

16. The method according to claim 15, wherein the recessing forms a bearing face inward from the peripheral rim and a convex area inward from the bearing face such that the bearing face is higher than the convex area and the peripheral rim is higher than the bearing face.

17. A mineral stone of monocrystalline or polycrystalline type for a horological movement, comprising:
- $AL_2O_3$ when the mineral stone is of monocrystalline type, or $al_2O_3Cr$ type polyruby or $ZrO_2$ type Zirconia when the mineral stone is of polycrystalline type,
- the stone being obtained by the method according to claim 1,
- wherein the stone comprises an upper face provided with a peripheral rim to laterally clamp an endstone in a bearing, and
- wherein the upper face comprises a bearing face for the endstone, the bearing face being disposed at a foot of a peripheral rim.

18. A timepiece, comprising:
the stone according to claim 17 for a bearing.

19. The stone according to claim 17, further comprising:
- a centered through hole,
- wherein the upper face comprises a convex area delimited between the bearing face and the hole, the area being convex concentrically from the bearing face to the hole.

20. The stone according to claim 19, wherein the bearing face is higher than the convex area and the peripheral rim is higher than the bearing face.

\* \* \* \* \*